(12) United States Patent
Lee

(10) Patent No.: US 8,204,375 B1
(45) Date of Patent: Jun. 19, 2012

(54) METHOD AND SYSTEMS FOR TESTING AUTOMATIC PROTECTION SWITCHING PROTOCOL IN OPTICAL INTERFACES FOR SYNCHRONOUS OPTICAL NETWORKS

(75) Inventor: Stanley Y. Lee, Framingham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 2841 days.

(21) Appl. No.: 10/051,832

(22) Filed: Jan. 17, 2002

(51) Int. Cl.
*H04B 10/00* (2006.01)

(52) U.S. Cl. .............................. 398/16; 398/25; 398/17

(58) Field of Classification Search .................. 398/1–38
See application file for complete search history.

(56) References Cited

U.S. PATENT DOCUMENTS 5,455,832 A * 10/1995 Bowmaster ................... 714/712
5,521,701 A * 5/1996 Felger et al. .................. 356/218

\* cited by examiner

*Primary Examiner* — Agustin Bello

(57) ABSTRACT

A standard test device is used to test the interoperability of a Synchronized Optical Network (SONET) optical interface, e.g., a 1+1 protected SONET interface. In one embodiment, two test sets, under the common control of a master controller, can be connected respectively to the working and protect lines of an optical interface. The controller then operates the test sets to test the operation of the interface under the Automatic Protection Switching (APS) protocol to verify interoperability based on the standards incorporated in the test sets while requiring minimal operator intervention. Alternatively, a single test set can include two connections that are connected, respectively, to the working and protection lines of the interface being tested. The test set can then test the operation of the interface under the APS protocol to verify interoperability based on the standards incorporated in the test set.

42 Claims, 5 Drawing Sheets

METHOD AND SYSTEMS FOR TESTING AUTOMATIC PROTECTION SWITCHING PROTOCOL IN OPTICAL INTERFACES FOR SYNCHRONOUS OPTICAL NETWORKS

TECHNICAL FIELD

The present invention relates generally to the field of telecommunications and, in particular, to a system and method for testing Synchronous Optical Network (SONET) optical interfaces for proper operation of the Automatic Protection Switching (APS) protocol of the SONET equipment. The present invention provides novel test set equipment with which the APS protocol of SONET optical interfaces can be tested as a standard procedure to demonstrate and certify interoperability with equipment from different manufacturers.

BACKGROUND OF THE INVENTION

Due to the large amount of information being transferred over Synchronous Optical Networks (SONET), there is a large financial stake in ensuring that the data transport services are as readily and, more importantly, consistently available as possible. To better insure consistent data transmission, SONET equipment is employed in a number of configurations that provide redundant transmission paths. If a fault does occur in any of these paths, the network can rapidly perform what is called a "protection switch." In a protection switch, the network moves data transmission from a line on which a fault has been detected to a redundant backup transmission line to avoid any interruption in data transmission. The protocol that governs the switching between redundant data transmission lines is referred to as Automatic Protection Switching (APS).

FIG. 1 illustrates a piece of telecommunications equipment (100) that is part of a synchronous optical network. The equipment (100) is connected to the network through a SONET optical interface (101). The interface (101) includes two connections (102, 103) with which the interface (101) can be connected to two redundant data transmission lines. One of the connections is typically referred to as the "working" connection (102). The other is typically referred to as the "protect" connection (103).

Data transmission is usually carried through the working connection (102) of the interface (101). However, under the APS protocol, if a fault is detected on the working or main line (102), the interface (101) can switch to using the protect connection (103) and the data line accessed through that connection to protect against any interruption in data flow.

FIG. 2 more fully illustrates an exemplary SONET optical network. As shown in FIG. 2, two pieces of telecommunications equipment (100a, 100b) are connected through a synchronous optical network, represented by two redundant data lines (104, 105). Each piece of equipment (100a, 100b) has a SONET optical interface (101a, 101b) for connection to the optical network.

As described above, each optical interface (101a, 101b) has two connections: one for a working or main line (102a, 102b) and one for a protect or backup line (103a, 103b). To prevent any loss of data transmission, if a fault is detected on the working or main line (104), data transmission can be switched to the protect or backup line (105). However, for this redundant data transmission system to work, there must be interoperability between the two optical interfaces (101a and 101b). For example, both interfaces (101a, 101b) must agree on when a fault has occurred such that data transmission will be switched from one line (104) to the other (105). Both interfaces (101a, 101b) must agree on when the fault has cleared and data transmission can be resumed on the main line (104). In other words, there must be compatibility in the APS protocol running on each of the two interfaces (101a, 101b).

However, optical SONET interfaces are currently being produced by many different network device manufacturers. Consequently, the equipment produced may incorporate varying interpretations of the APS protocol standards and other relevant specifications. The equipment may also vary as to the degree the APS protocol and other specifications are implemented.

With enormous interconnection requirements between equipment from different vendors of these optical interfaces, interoperability has become a major problem for service providers. The fact that there are some equipment manufacturers with little to no experience in the telecommunications field compounds this problem. As a result, a great deal of testing is required to ensure that the equipment not only complies with the relevant standards, but also that it will successfully interoperate with the numerous other devices that comprise the network.

It would be very advantageous to the service provider to be able to perform such compatibility tests in a controlled environment before actually connecting the devices in the field. However, the surest current method of testing these optical devices is to gather all of the necessary pieces of equipment, i.e., all the equipment that will be used in the network, and then assemble a model network in a lab. At a minimum, this would require assembling a network such as that illustrated in FIG. 2. However, it is much more likely that the interoperability of more than just two interfaces (e.g., 101a, 101b) may have to be checked.

After the sample network is constructed the relevant tests can be performed to insure the interoperability of all the network components, particularly the SONET optical interfaces. The problem with this method of testing for interoperability is that a service provider typically only has access to the equipment that will reside on its own end of the network. It is difficult and expensive to also procure the equipment that will be used at one or more customer sites merely for the purpose of assembling a test network in which interoperability of network interfaces can be verified.

Consequently, there is a great need in the art for a means and method of determining the interoperability of optical network interfaces without having to assemble a test network including all the anticipated components that must successfully work together.

SUMMARY OF THE INVENTION

The present invention meets the above-described needs and others. Specifically, the present invention provides a means and method of determining the interoperability of optical network interfaces without having to assemble a test network including all the anticipated components that must successfully work together.

Additional advantages and novel features of the invention will be set forth in the description which follows or may be learned by those skilled in the art through reading these materials or practicing the invention. The advantages of the invention may be achieved through the means recited in the attached claims.

The present invention may be embodied as, among other things, a device for testing compatibility of an Automatic Protection Switching (APS) protocol of an optical interface for use in a synchronized optical network with a standardized APS protocol. In a first preferred embodiment, the present invention preferably includes a first test set loaded with the standardized APS protocol and a second test set also loaded with the standardized APS protocol. The first test set has a connector for connection to a working or main data line of the optical network. The second test set has a connector for connection to a protect or backup data line of the optical network. A test set controller is connected to the first and second test sets for commonly controlling the first and second test sets.

The test set controller automatically controls the first and second test sets to send signals to and receive signals from the optical interface under test. The test set controller can then determine the level of compatibility between the APS protocol of the optical interface under test and the standardized APS protocol used by the test sets based on the signals sent and received by the first and second test sets.

When operating, the system of the present invention tests an optical interface with a working or main data line connected between the connector of the first test set and a working connector of the optical interface under test; and a protect or backup data line connected between the connector of the second test set and a protect connector of the optical interface under test. Preferably, a user interface is connected to the test set controller for allowing a user to control the test set controller.

In a second preferred embodiment, the present invention preferably includes a single test set loaded with the standardized APS protocol. The test set includes a first connector for connection to a working or main data line of the optical network, and a second connector for connection to a protect or backup data line of the optical network.

The test set sends signals to and receives signals from the optical interface under test through the first and second connectors to test the APS protocol of the optical interface. As before, the test set determines a level of compatibility between the APS protocol of the optical interface under test and the standardized APS protocol used by the test set based on the signals sent to and received from the optical interface.

When operating, this system of the present invention tests an optical interface with a working or main data line connected between the first connector of the test set and a working connector of the optical interface under test; and a protect or backup data line connected between the second connector of the test set and a protect connector of the optical interface under test. Preferably, a user interface is connected to the test set controller for allowing a user to control the test set.

The present invention also encompasses any method of making or operating a system of the present invention such as those described above. More specifically, the present invention encompasses a method of testing compatibility of an Automatic Protection Switching (APS) protocol of an optical interface for use in a synchronized optical network with a standardized APS protocol by providing an automated test set controller that controls a first test set loaded with the standardized APS protocol and a second test set also loaded with the standardized APS protocol. The first test set has a connector for connection to a working or main data line of the optical network, and the second test set has a connector for connection to a protect or backup data line of the optical network.

This method may continue by providing an optical interface under test; connecting the first and second test sets with the test set controller; connecting a working or main data line between the connector of the first test set and a working connector of the optical interface under test; and connecting a protect or backup data line between the connector of the second test set and a protect connector of the optical interface under test. The method may concluded by automatically controlling the first and second test sets to send signals to and receive signals from the optical interface under test; and determining a level of compatibility between the APS protocol of the optical interface under test and the standardized APS protocol based on the signals sent and received by the first and second test sets.

In another embodiment, the present invention encompasses a method of testing compatibility of an Automatic Protection Switching (APS) protocol of an optical interface for use in a synchronized optical network with a standardized APS protocol by providing a test set loaded with the standardized APS protocol. In the test set, a first connector for connection to a working or main data line of the optical network is provided; and a second connector for connection to a protect or backup data line of the optical network is also provided.

This method may continue by providing an optical interface under test; connecting a working or main data line between the first connector of the test set and a working connector of the optical interface under test; and connecting a protect or backup data line between the second connector of the test set and a protect connector of the optical interface under test. Next, this method may include sending signals to and receiving signals from the optical interface under test through the working and protect data lines to test the APS protocol of the optical interface.

This method may conclude by determining a level of compatibility between the APS protocol of the optical interface under test and the standardized APS protocol based on the signals sent to and received from the optical interface. The method may optionally include controlling the test set with a user interface connected to the test set.

BRIEF DESCRIPTION OF THE DRAWINGS

The accompanying drawings illustrate preferred embodiments of the present invention and are a part of the specification. Together with the following description, the drawings demonstrate and explain the principles of the present invention. The illustrated embodiment are examples of the present invention and do not limit the scope of the invention.

Throughout the drawings, identical elements are designated by identical reference numbers.

DETAILED DESCRIPTION OF THE PREFERRED EMBODIMENTS

The present invention provides, among other things, a means and method of testing the interoperability of a Synchronous Optical Network (SONET) optical interface against a standard test device, e.g., a 1+1 protected SONET optical interface. In one embodiment, two test sets, under the common control of an automated controller, can be connected respectively to the working and protect lines of an optical interface. The controller then operates the test sets to test the operation of the interface under the Automatic Protection Switching (APS) protocol to verify interoperability based on the standards incorporated in the test sets while requiring minimal operator intervention. Alternatively, a single test set can include two connections that are connected, respectively, to the working and protection lines of the interface being tested. The test set can then test the operation of the interface under the APS protocol to verify interoperability based on the standards incorporated in the test set.

Figure 1:
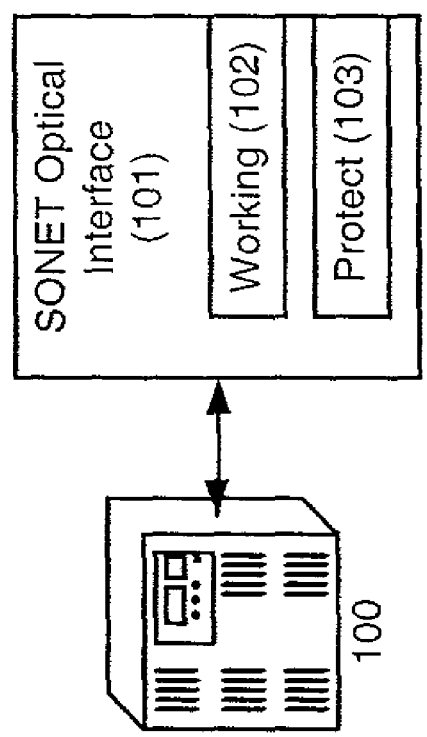
FIG. 1 is a block diagram of a typical 1+1 protected SONET optical interface.
Figure 2:
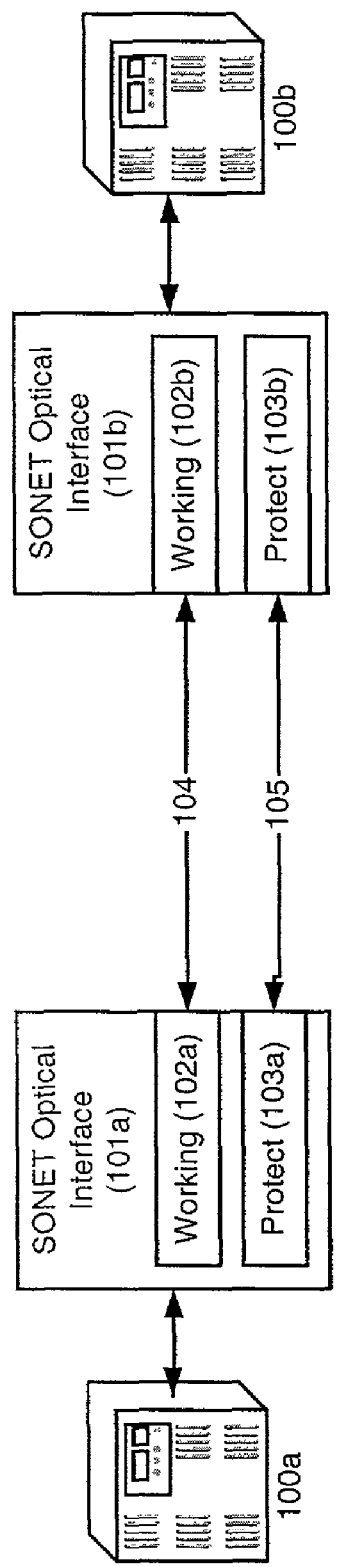
FIG. 2 is a block diagram of a basic SONET network in which at least two components are networked through optical interfaces.
Figure 3:
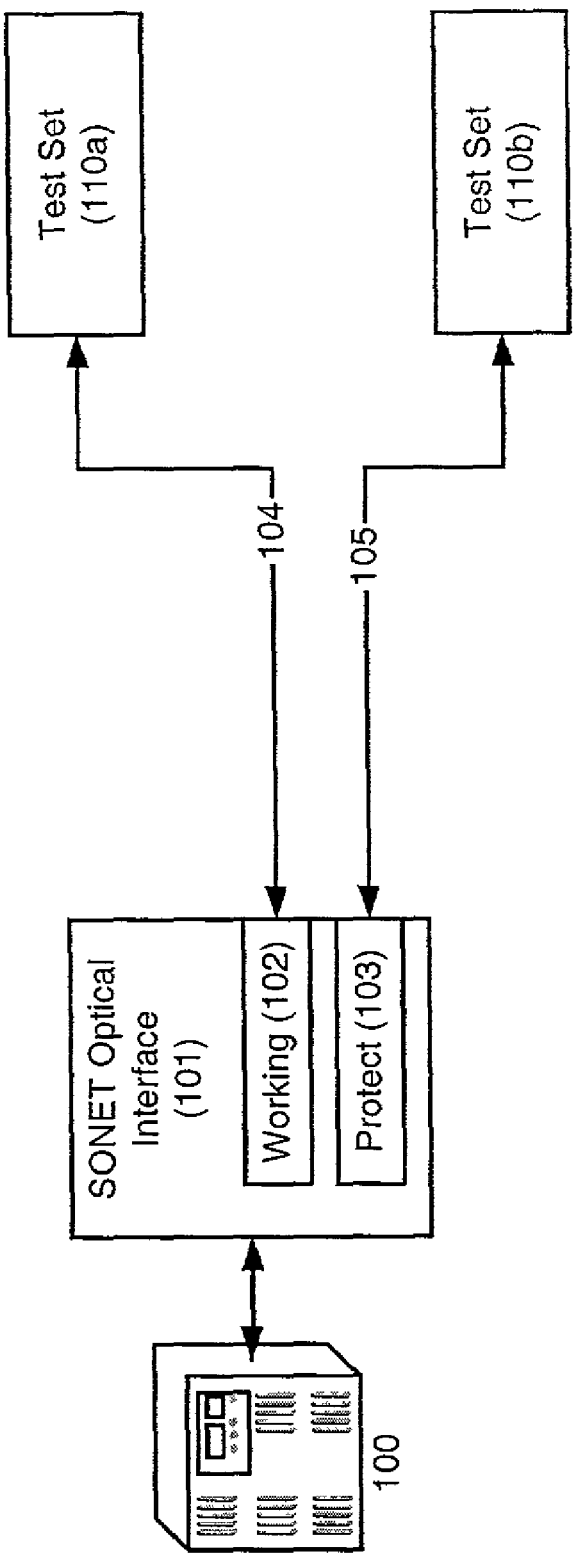
FIG. 3 is a block diagram of a system for testing the operation of an optical interface using multiple, unconnected standard test sets.

FIG. 3 illustrates a method of testing the operation of an optical interface (101) for use in a synchronous optical network. The interface (101) is typically used to connect a piece of telecommunications hardware (100) to the optical network. As shown in FIG. 3, the optical interface (101) has a working connection (102) for connection to a working or main data transmission line (104) and a protect connection (103) for connection to a protect or backup data transmission line (105).

A first standard test set (110a) is connected to the working line (104). A second standard test set (110b) is connected to the protect line (105). Each test set (110a, 110b) can transmit data signals to the optical interface (101), receive data signals from the optical interface (101) and simulate faults in data transmission that may occur on the data transmission lines (104, 105).

However, each test set (110a, 110b) must be operated manually by an operator. In order to test whether the APS protocol running on the interface (101) will respond to and be compatible with the standards incorporated in the test sets (110a, 110b). For example, the operator will have to use one of the test sets, e.g., the first test set (110a) to generate a simulated fault condition on the data line (104). If the interface (101) responds properly to this fault, the interface (101) will switch transmissions to the protect or backup line (105). Consequently, the operator will then have to monitor the second test set (110b) to verify that the APS protocol on the optical interface (101) has caused the interface (101) to respond properly to the simulated fault condition.

In order to fully test the interface (101) for interoperability with the APS protocol standards of the test sets (110a, 110b), the operator will likely have to generate a number of simulated fault conditions under a variety of different parameters on both data lines (104, 105) and then verify an appropriate response from the interface (101). Obviously, this requires a burdensome amount of operator time and attention.

Using standardized test sets to establish the level of compatibility or interoperability of the interface (101) against a common standard embodied in the standardized test sets is much easier than full assembly of a proposed network including both provider and client interfaces to test the interoperability of those interfaces. If each manufacturer establishes that its equipment is compatible or operable with the standard test set, confidence is gained that equipment from those various manufacturers will also be compatible and interoperable when connected to each other via a SONET.

However, it is cumbersome and expensive to maintain and use two test sets (110a, 110b) as illustrated in FIG. 3. Even more limiting is the manual coordination of the testing that is required, the manual interpretation of the specifications, and manual interpretation of the test results. The manual work is tedious, time consuming, and particularly prone to errors.

Figure 4:
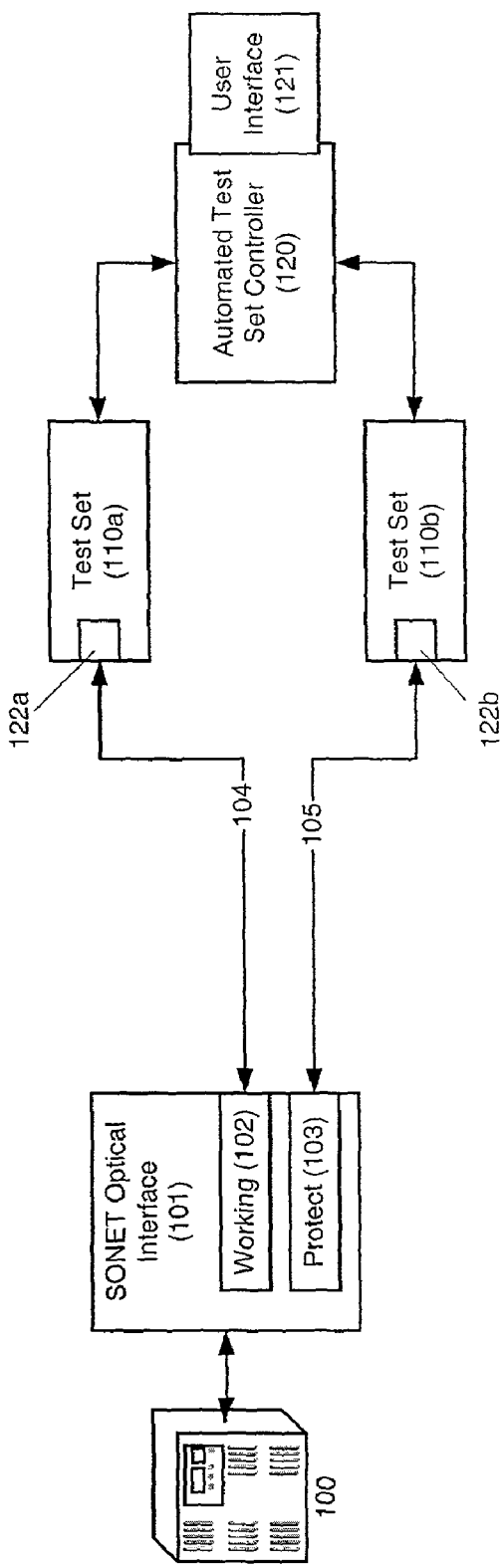
FIG. 4 is block diagram of a system for testing the operation and interoperability of an optical interface using two test sets controlled by a master controller according to the principles of the present invention.

Consequently, under the principles of the present invention, a means and method are provided for more automatically testing the APS protocol on the optical interface (101) for compatibility and interoperability with the standards embodied in a test set device. FIG. 4 illustrates a first preferred embodiment of the present invention.

As shown in FIG. 4, two test sets (110a and 110b) are again connected, respectively, to the working line (104) and the protect line (105) of an optical interface (101). A connector (122a) of the first test set (110a) connects to the working line (104), and a second connector (122b) of the second test set (110b) connects to the redundant protect line (105). Correspondingly, a working connection (102) of the interface (101) receives the working line (104), and a protect connection (103) of the interface (101) receives the protect line (105).

The two test sets (110a and 110b) are also connected to and controlled by a common test set controller (120). The automated test set controller (120) controls the two test sets (110a, 110b) to interact with the optical interface (101).

Using the standardized APS protocol incorporated into the test sets (110a, 110b), the controller (120) will cause the test sets (110a, 110b) to generate simulated fault conditions and other conditions to which the interface (101), running its own versions of the APS protocol, should respond.

The controller (120) also monitors the response of the interface (101) to the test through the test sets (110b). Thus, if the interface (101) responds to a simulated fault condition by switching the active data line, for example, from the working or main line (104) to the protect or backup line (105), the controller (120) will detect the response.

The automated test set controller (120) is programmed to perform all desired compatibility and interoperability tests on the interface (101) and to receive and interpret the results. Thus, the degree to which the interface (101) is compatible with the APS standards incorporated into the test sets (110a, 110b) can be readily and rapidly determined. Manufacturers can then certify that their interfaces are compatible with the standard test equipment and should, therefore, be compatible with any other interface that is also compatible with the standard test equipment.

The tests and test algorithms that must be performed to verify the compatibility of the interface (101) being tested will be apparent to those skilled in the art and are not, therefore, detailed herein. The number and parameters of the tests can be determined based on the specific application and the degree to which compatibility of the APS protocol of the interface (101) being tested must be determined.

A user interface (121) can be provided as part of or in connection with the test set controller (120). With the user interface (121), the operator can initiate testing of the optical interface (101) and receive the results of the test. The operater may tailor the testing of the interface (101) as desired through the user interface (121). The user interface (121), for example, may include a display device or monitor and a keypad, keyboard or other data entry device.

Figure 5:
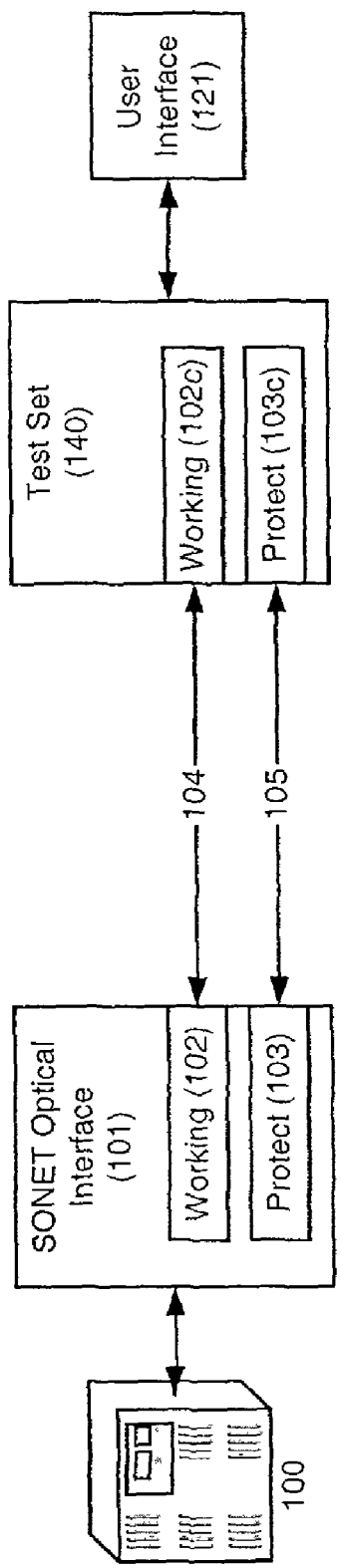
FIG. 5 is a block diagram of a test set for testing both connections of an optical interface so as to test for interoperability of the interface according to the principles of the present invention.

FIG. 5 illustrates a second preferred embodiment of the present invention. As shown in FIG. 5, an optical interface (101) to be tested has a working connection (102) for connection to a working or main line (104) and a protect connection (103) for connection to a protect or backup line (105).

A standard test set (140) is provided. The test set (140) is preferably a single unit with both a working connection (102c) for connection to a working or main data line (104) and a protect connection (103c) for connection to a protect or backup data line (105). In this regard, the test set (140) models the interface (101) by including connections for both redundant data lines (104, 105).

Using a standardized APS protocol incorporated into the test set (140), the test set (140) will simulate a second optical interface on the network (104, 105). This entails generating simulated fault conditions and other conditions to which the interface (101), running its own versions of the APS protocol, should respond.

The test set (140) also monitors the response of the interface (101) to the test through the working and protect connections (102c, 103c). Thus, if the interface (101) responds to a simulated fault condition by switching the active data line, for example, from the working or main line (104) to the protect or backup line (105), the test set (140) will detect the response.

The test set (140) is programmed to perform all desired compatibility and interoperability tests on the interface (101) and to receive and interpret the results. Thus, the degree to which the interface (101) is compatible with the APS standard incorporated into the test set (140) can be readily and rapidly determined. Manufacturers can then certify that their interfaces are compatible with the standard test equipment and should, therefore, be compatible with any other interface that is also compatible with the standard test equipment.

A user interface (121) can be provided as part of or in connection with the test set (140). With the user interface (121), the operator can initiate testing of the optical interface (101) and receive the results of the test. The operate may tailor the testing of the interface (101) as desired through the user interface (121). The user interface (121), for example, may include a display device or monitor and a keypad, keyboard or other data entry device.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A device for testing compatibility of an Automatic Protection Switching (APS) protocol of an optical interface for use in a synchronized optical network with a standardized APS protocol, said device comprising:
    a first test set loaded with said standardized APS protocol, said first test set comprising a connector for connection to a working or main data line of said optical network;
    a second test set loaded with said standardized APS protocol, said second test set comprising a connector for connection to a protect or backup data line of said optical network; and
    a test set controller connected to said first and second test sets for controlling said first and second test sets.

2. The device of claim 1, wherein said test set controller automatically controls said first and second test sets to send signals to and receive signals from said optical interface under test.

3. The device of claim 2, wherein said test set controller determines a level of compatibility between said APS protocol of said optical interface under test and said standardized APS protocol based on said signals sent and received by said first and second test sets.

4. The device of claim 1, further comprising a user interface connected to said test set controller for allowing a user to control said test set controller.

5. The device of claim 1, further comprising:
    an optical interface under test;
    a working or main data line connected between said connector of said first test set and a working connector of said optical interface under test; and
    a protect or backup data line connected between said connector of said second test set and a protect connector of said optical interface under test.

6. A device for testing compatibility of an Automatic Protection Switching (APS) protocol of an optical interface for use in a synchronized optical network with a standardized APS protocol, said device comprising:
    a test set loaded with said standardized APS protocol, said test set further comprising;
    a first connector for connection to a working or main data line of said optical network, and
    a second connector for connection to a protect or backup data line of said optical network.

7. The device of claim 6, wherein said test set comprises:
    a first test set loaded with said standardized APS protocol and incorporating said first connector;
    a second test set loaded with said standardized APS protocol and incorporating said second connector; and
    a test set controller connected to said first and second test sets for controlling said first and second test sets.

8. The device of claim 6, wherein said test set sends signals to and receives signals from said optical interface under test through said first and second connectors to test said APS protocol of said optical interface.

9. The device of claim 8, wherein said test set determines a level of compatibility between said APS protocol of said optical interface under test and said standardized APS protocol based on said signals sent to and received from said optical interface.

10. The device of claim 6, further comprising a user interface connected to said test set for allowing a user to control said test set.

11. The device of claim 6, further comprising:
    an optical interface under test;
    a working or main data line connected between said first connector of said test set and a working connector of said optical interface under test; and
    a protect or backup data line connected between said second connector of said test set and a protect connector of said optical interface under test.

12. A method of testing compatibility of an Automatic Protection Switching (APS) protocol of an optical interface for use in a synchronized optical network with a standardized APS protocol, said method comprising providing an automated test set controller that controls a first test set loaded with said standardized APS protocol and a second test set loaded with said standardized APS protocol, said first test set comprising a connector for connection to a working or main data line of said optical network and said second test set comprising a connector for connection to a protect or backup data line of said optical network.

13. The method of claim 12, further comprising:
    providing an optical interface under test;
    connecting said first and second test sets with said test set controller;
    connecting a working or main data line between said connector of said first test set and a working connector of said optical interface under test; and
    connecting a protect or backup data line between said connector of said second test set and a protect connector of said optical interface under test.

14. The method of claim 13, further comprising automatically controlling said first and second test sets to send signals to and receive signals from said optical interface under test.

15. The method of claim 14, further comprising determining a level of compatibility between said APS protocol of said optical interface under test and said standardized APS protocol based on said signals sent and received by said first and second test sets.

16. The method of claim 12, further controlling said test set controller through a user interface connected to said test set controller.

17. The method of claim 13, further comprising:
determining whether said optical interface under test is compatible with said first and second test sets; and
if said optical interface under test is compatible with said first and second test sets, certifying that said optical interface under test is compatible with said test sets as an indicator that said optical interface under test will be compatible with any other optical interface that is compatible with corresponding test sets.

18. A method of testing compatibility of an Automatic Protection Switching (APS) protocol of an optical interface for use in a synchronized optical network with a standardized APS protocol, said method comprising:
providing a test set loaded with said standardized APS protocol;
providing, in said test set, a first connector for connection to a working or main data line of said optical network; and
providing, in said test set, a second connector for connection to a protect or backup data line of said optical network.

19. The method of claim 18, further comprising:
providing an optical interface under test;
connecting a working or main data line between said first connector of said test set and a working connector of said optical interface under test; and
connecting a protect or backup data line between said second connector of said test set and a protect connector of said optical interface under test.

20. The method of claim 19, further comprising sending signals to and receiving signals from said optical interface under test through said working and protect data lines to test said APS protocol of said optical interface.

21. The method of claim 20, further comprising determining a level of compatibility between said APS protocol of said optical interface under test and said standardized APS protocol based on said signals sent to and received from said optical interface.

22. The method of claim 18, further comprising controlling said test set with a user interface connected to said test set.

23. The method of claim 19, further comprising:
determining whether said optical interface under test is compatible with said test set; and
if said optical interface under test is compatible with said test set, certifying that said optical interface under test is compatible with said test set as an indicator that said optical interface under test will be compatible with any other optical interface that is compatible with a corresponding test set.

24. A system for testing compatibility of an Automatic Protection Switching (APS) protocol of an optical interface for use in a synchronized optical network with a standardized APS protocol, said system comprising:
a first test means for sending signals to and receiving signals from an optical interface under test based on said standardized APS protocol;
a second test means for sending signals to and receiving signals from said optical interface under test based on said standardized APS protocol; and
a control means for automatically controlling said first and second test means to test said optical interface under test.

25. The system of claim 24, further comprising:
an optical interface under test;
means for connecting said first and second test means with said test set control means;
means for connecting a working or main data line between said first test means and a working connector of said optical interface under test; and
means for connecting a protect or backup data line between said second test means and a protect connector of said optical interface under test.

26. The system of claim 24, further comprising means for determining a level of compatibility between said APS protocol of said optical interface under test and said standardized APS protocol based on said signals sent and received by said first and second test means.

27. The system of claim 24, further means for allowing a user to control said control means.

28. A system for testing compatibility of an Automatic Protection Switching (APS) protocol of an optical interface for use in a synchronized optical network with a standardized APS protocol, said system comprising:
a test means for testing an optical interface under test, said test means loaded with said standardized APS protocol, said test means further comprising;
first connection means for connection to a working or main data line of said optical network, and
second connection means for connection to a protect or backup data line of said optical network.

29. The system of claim 28, further comprising:
an optical interface under test;
means for connecting a working or main data line between said first connection means of said test means and a working connector of said optical interface under test; and
means for connecting a protect or backup data line between said second connection means of said test means and a protect connector of said optical interface under test.

30. The system of claim 29, further comprising means for determining a level of compatibility between said APS protocol of said optical interface under test and said standardized APS protocol based on said signals sent to and received from said optical interface.

31. The system of claim 28, further comprising means for allowing a user to control said test means.

32. A device for testing compatibility of an optical interface for use in a synchronized optical network with a standardized Automatic Protection Switching (APS) protocol, said device comprising:
a first test set loaded with said standardized APS protocol, said first test set comprising a connector for connection to a first connector of said optical interface;
a second test set loaded with said standardized APS protocol, said second test set comprising a connector for connection to a second connector of said optical interface; and
a test set controller connected to said first and second test sets for controlling said first and second test sets, wherein said test set controller is configured to use output from both said first test set and said second test set to determine said compatibility of said optical interface with said APS protocol.

33. The device of claim 32, wherein said test set controller automatically controls said first and second test sets to send signals to and receive signals from said optical interface'under test.

34. The device of claim 32, wherein said test set controller determines a level of compatibility between an APS protocol of said optical interface under test and said standardized APS protocol based on said signals sent and received by said first and second test sets.

35. The device of claim 32, further comprising a user interface connected to said test set controller for allowing a user to control said test set controller.

36. A device for testing compatibility of an Automatic Protection Switching (APS) protocol of an optical interface for use in a synchronized optical network with a standardized APS protocol, said device comprising:
- a test set loaded with said standardized APS protocol, said test set further comprising;
- a first connector for connection to a working or main data line of said optical interface, and
- a second connector for connection to a protect or backup data line of said optical interface;
- wherein said device is configured to use output from both said main data line and said backup data line to determine said compatibility of said optical interface with said APS protocol.

37. The device of claim 36, wherein said test set comprises:
- a first test set loaded with said standardized APS protocol and incorporating said first connector;
- a second test set loaded with said standardized APS protocol and incorporating said second connector; and
- a test set controller connected to said first and second test sets for controlling said first and second test sets.

38. The device of claim 36, wherein said test set sends signals to and receives signals from said optical interface under test through said first and second connectors to test an APS protocol of said optical interface.

39. The device of claim 38, wherein said test set determines a level of compatibility between said APS protocol of said optical interface under test and said standardized APS protocol based on said signals sent to and received from said optical interface.

40. A method of testing compatibility of an Automatic Protection Switching (APS) protocol of an optical interface for use in a synchronized optical network with a standardized APS protocol, said method comprising:
- connecting a working data line of said optical interface to a test set device;
- connecting a protect data line of said optical interface to said test set device; and
- using a standardized APS protocol of said test set device, testing said APS protocol of said optical interface for compatibility with said standardized APS protocol.

41. The method of claim 40, further comprising determining a level of compatibility of said APS protocol and said standardized APS protocol based on responses of said optical interface to test signals on said working data line and said protect data line.

42. The method of claim 41, further comprising, if said APS protocol of said optical interface is compatible with said standardized APS protocol of said test set device, certifying that said optical interface is compatible with said test set device as an indicator that said optical interface will be compatible with any other optical interface that is compatible with corresponding test set device.

* * * * *